Dec. 4, 1962 F. T. PARFREY Re. 25,290

METHOD OF AND MEANS FOR FORMING HOLLOW ARTICLES

Original Filed May 9, 1956 5 Sheets-Sheet 1

INVENTOR
FRANCIS TRIGG PARFREY
BY
Oberlin, Maky & Donnelly
ATTORNEYS

Dec. 4, 1962 F. T. PARFREY Re. 25,290

METHOD OF AND MEANS FOR FORMING HOLLOW ARTICLES

Original Filed May 9, 1956 5 Sheets-Sheet 2

INVENTOR
FRANCIS TRIGG PARFREY
BY
Oberlin, Maky & Donnelly
ATTORNEYS

METHOD OF AND MEANS FOR FORMING HOLLOW ARTICLES

Original Filed May 9, 1956 5 Sheets-Sheet 3

INVENTOR
FRANCIS TRIGG PARFREY
BY Oberlin, Maky & Donnelly
ATTORNEYS

METHOD OF AND MEANS FOR FORMING HOLLOW ARTICLES

Original Filed May 9, 1956 5 Sheets-Sheet 4

INVENTOR
FRANCIS TRIGG PARFREY
BY
Oberlin, Maky & Donnelly
ATTORNEYS

METHOD OF AND MEANS FOR FORMING HOLLOW ARTICLES

Original Filed May 9, 1956 5 Sheets-Sheet 5

INVENTOR
FRANCIS TRIGG PARFREY
BY Oberlin, Maky & Donnelly
ATTORNEYS

United States Patent Office

Re. 25,290
Reissued Dec. 4, 1962

25,290

METHOD OF AND MEANS FOR FORMING HOLLOW ARTICLES

Francis Trigg Parfrey, Wangee, Metung, Victoria, Australia

Original No. 2,930,079, dated Mar. 29, 1960, Ser. No. 583,664, May 9, 1956. Application for reissue Sept. 29, 1961, Ser. No. 142,461
Claims priority, application Australia Dec. 17, 1951
20 Claims. (Cl. 18—5)

Matter enclosed in heavy brackets [ ] appears in the original patent but forms no part of this reissue specification; matter printed in italics indicates the additions made by reissue.

This invention relates to a new and improved method of and means for forming hollow articles, such as bottles, in thermo-plastic synthetic materials such as polyvinyl chloride, polythene and the like (hereinafter, for brevity, referred to as "plastics" or "plastic materials").

This application is a continuation-in-part of my prior application Serial No. 325,135, now Patent No. 2,903,740.

Previously it has been proposed to make hollow articles, such as bottles, flasks or jars from thermo-plastic material, such as polythene, by use of a machine having a rotating table provided with a series of moulds or dies thereon, the plastic material to be formed to a desired shape being inserted into a mould, then heated and expanded under pressure of air to the requisite shape, then cooled and finally ejected. In the performance of the several operations the table is rotated from station to station and the output on the machine is continuous—each mould having a single hollow article formed in it in each complete cycle of operations and each formed article being ejected from its mould at a definite station. However, this process is not altogether satisfactory as it is necessary to heat the tubular plastic material after it has been placed in a die or mould and, moreover, the apparatus required is relatively expensive. In addition, it is necessary to provide several moulds of the article to be formed and this can be relatively expensive—the proportionate die cost of the article is increased by the necessity to provide more than one mould.

In order to provide for an increase in the rate of production of plastic hollow-ware there has been devised an alternative process, somewhat similar to the above, in which the tubular material to be moulded is extruded directly from an extrusion machine into the successive moulds, each mould is closed, so as to close the ends of the tubular plastic material, then the material is blown to shape, by forcing air through a needle inserted through the wall of the tubular material at one end, then the formed hollow article is allowed to cool and finally ejected from the mould. In this process the step of heating the plastic material is eliminated, but it is necessary to cut away the closed end adjacent the formed neck of the bottle.

It is also known to blow air under pressure through the tubular material which is being extruded, the air being blown through a nozzle mounted within the extrusion nozzle and the lower end only of the tubular material being clamped closed in the die or mould. However, that process is relatively slow as extrusion cannot be continued rapidly during the operations of blowing the material to shape in the die and then cooling the formed hollow article.

It is to be realized that in order to achieve a high rate of production in the automatic manufacture of bottles and/or other hollow articles from plastic material it is necessary to eliminate as far as possible all waiting time so that no operation is held up or delayed owing to the time taken for performing another operation in the series of operations required for the production of the desired article. For example it is desirable that the process of extruding the plastic material be continued during the operations of blowing, cooling and ejecting the hollow article even though the blowing apparatus is not in position to receive the extruded plastic tubing.

Furthermore, it will be appreciated that if there be required but a single complete mould or die for the formation of the articles at a desired rate then the cost of production of the articles will be much lower than would be the cost if there were required, say, ten complete dies in order to achieve the same production rate. In addition, the initial cost of the machine or apparatus for making the articles has a bearing upon the cost of production as the depreciation of the machine must be charged against production.

This invention has been devised primarily with the object of providing an improved method of and means for forming hollow articles—such as plastic bottles—which will allow a relatively high rate of output without a correspondingly high labour cost, and yet will not necessitate a relatively high machine and die cost. A further object is to devise a manner of making plastic hollow-ware which will be more efficient than the methods previously proposed. Another object is to provide a process of and means for manufacturinng hollow-ware of plastic material which will be conducive to a more rapid and economical production than has hitherto been possible, especially in short production runs, and a high flexibility in the use of the apparatus made according to the invention.

The invention devised with these and other objects in view resides, broadly, in a method of forming hollow articles of plastic material including the steps of extruding plastic material over a nozzle or mandrel, closing a die about the plastic material, blowing fluid under pressure through the nozzle or mandrel and into the plastic material so as to force it to the internal shape of the die, cooling the formed hollow article, and ejecting the formed article from the die.

The extrusion of the plastic material may be continued while some of the other operations or steps of the process are effected so that the waiting time is materially reduced, and the die is moved away from the extrusion nozzle (after it has been closed about a length of the plastic material) so that the extrusion can continue without interference. The mandrel may be moved relative to the die so as to eject the formed hollow article, and the die and mandrel returned to initial position so as to be in readiness to start the process again.

The invention, according to another aspect, includes the steps of extruding tubular plastic material to a desired position at which it may be readily clamped between the parts of a moulding die, inserting the end of a mandrel into the end of the tubular plastic material and closing the die about the plastic material so that one end of the plastic material is engaged about the mandrel and the other end of the plastic material is closed, blowing fluid under pressure through the mandrel into the tubular plastic material so as to force that material to the internal shape of the die, cooling the formed hollow article, and ejecting the formed hollow article from the die.

The apparatus devised for the purpose of carrying the invention into effect includes a fluid injection nozzle or mandrel, a mounting for the parts of a die which may be conveniently located beneath the extrusion nozzle of a plastic extrusion machine so that plastic material may be extruded over the mandrel or over the position at which the mandrel is held prior to its engagement with the tubular material, and means for opening and closing the die, the mandrel being operable for the purpose of injecting fluid under pressure into the interior of the extruded plastic material clamped in the die so as to force that material to the internal shape of the die.

There are also provided means for moving the die mounting from and to its position immediately below the extrusion nozzle, means for exhausting the fluid from the interior of the formed hollow article, and means for ejecting the formed hollow article, such latter means may incorporate means for tilting the mandrel.

A principal feature of the invention is that of extruding the plastic material over the mandrel location and the moving of the die—after it has been closed on the plastic material—away from the extrusion head or nozzle of the extrusion machine so that the extrusion operation can proceed without interruption whilst the other steps of the process are being carried out. Another important feature is the particular sequence of operations, which leads to a relatively high rate of output of formed hollow articles using a single-die machine.

The invention may be used with either a screw-type plastic extrusion machine or a ram-type machine, with very little modification in the process or the apparatus.

In order that the invention will be clearly understood and readily put into practical form I shall now describe with reference to the accompanying sheets of illustrative drawings, a preferred construction of apparatus made according to the invention, as used with a screw-type extruder and a modified construction of apparatus as used with a ram-type extruder. I shall also describe the operation of the apparatus to perform the method I have devised for forming hollow articles of plastic materials. In these drawings.

Figure 14:
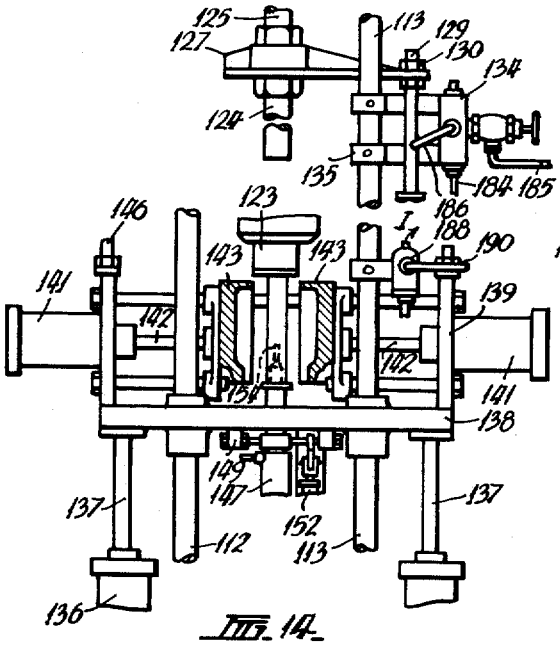
Figure 16:
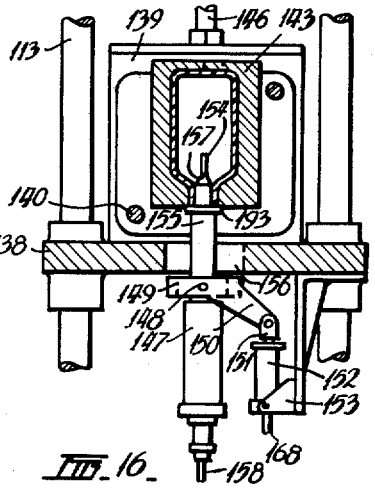
Figure 17:
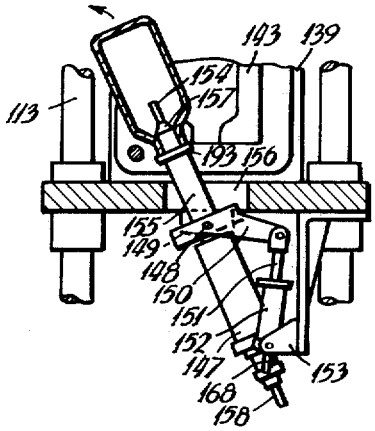
Figure 15:
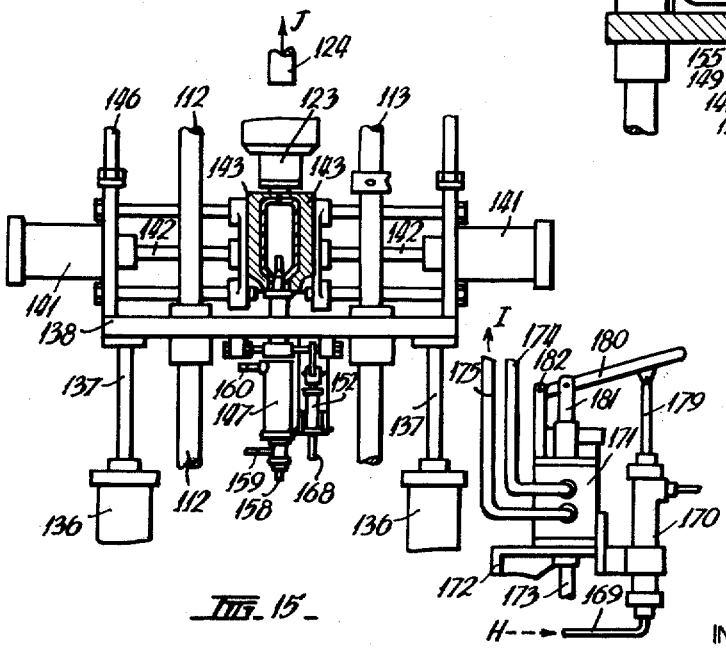

FIGS. 14, 15, 16 and 17 are views of the die and mandrel mounting means, illustrating the positions of the die members in consecutive operations of the apparatus; the FIGS. 14 and 15 being views from the front of the apparatus and FIGS. 16 and 17 being views, on larger scale, from the side of the apparatus.

Referring initially to FIGS. 2, 3, 4, 5 and 6 the moulding die consists of two principal parts indicated by the reference letters A and B. Each of these die parts is fastened to a bracket 15 of somewhat angle shape, and the two brackets 15 are pivotally mounted, near the ends of their lower arms 16, upon two bolts 17 fitted through the upper end portions of the sides of a channel or U-shaped mounting member 18, the two brackets 15 being mounted in such manner that the brackets may be moved pivotally apart to open the two die parts A and B. Each bracket 15 has a groove or channel 19 in the outer side of its upper arm and an opening 20 at about the angle or bend, the lower arm 16 being bifurcated. The lower arms 16 of the brackets 15 are pivotally mounted on the bolts 17 in the manner depicted particularly in FIG. 4.

The mounting member 18 has a relatively wide base 21 which is screwed on to the upper end of an externally screw-threaded cylinder 22 of a pneumatic ram. The top plate 23 of the cylinder 22 is clamped tightly on to the top of the cylinder 22 and fastened to the base 21 by screws 24.

The piston 25 of the ram has connected to it a tubular piston rod 26 which extends upwardly through the top plate 23. A helical compression spring 27 is fitted about the tubular piston rod 26 so as to be adapted to press the piston 25 downwardly. At the upper end of the tubular piston rod 26 there is fastened a platform 28 which is locked in position on the tubular piston rod 26 by means of a lock nut 29. The platform 28 has, on its upper surface, several lugs 30 so spaced that they are located directly beneath the bifurcated lower arms 16 of the brackets 15, at about the bend or angle of said brackets. The lugs 30 are thus adapted to bear upon the undersides of the two brackets 15 so that when the platform 28 is raised by the action of the pneumatic ram it will press upwardly upon the brackets 15 and move said brackets pivotally to close the die parts A and B.

The platform 28 is operatively connected to the brackets 15 by slotted links 31, the links 31 being pivotally mounted upon bars 32 which are fitted through the lugs 30 and engaging with parallel bars 33 fitted through the brackets 15 at about the angles of bends thereof. The upper end portions of the links 31 are slotted at 34 so that said links can move downwardly for a short distance relative to the bars 33 without inducing movement in said bars.

Each of the die parts A and B has, at its upper end, a top member 35 which is pivotally mounted upon a pin 36. Each of the top members has an outwardly extending bifurcated arm 37 to which is pivotally connected a block 38. A rod 39 is connected to each of the bars 32, and each rod 39 fits through the relative block 38, the rod 39 being partly accommodated for the major portion of its length in the groove or channel 19 in the outer side of the bracket 15. Each rod 39 is screw threaded at 40 and on the screw threaded portion is a knurled nut 41, an upper knurled nut 42 and a helical compressing spring 43. By adjusting the position of the nut 41 on the rod 39 the pressure of the spring 43 may be varied and by adjusting the upper nut 42 the relative top member 35 may be set so that when the die parts A and B are in closed position the top members 35 will be correctly closed to constitute the top of the die.

When the platform 28 is moved downwardly the top members 35 will be opened instantly as there is a direct connection between the platform 28 and each top member 35, but the platform, by its movement, will not cause the die parts A and B to be opened pivotally until the platform 28 has moved such a distance that the slotted links 31 engage the bars 33 and cause the brackets 15 to move pivotally.

The cylinder 22 of the pneumatic ram is screwed into a sleeve member 44 which is fitted through the bottom portion of a somewhat U-shaped hanger bracket 45 and held in position by a nut 46 engaged upon its upper end. A lock nut 47 is screwed on to the cylinder 22 and operates to hold the cylinder firmly against rotational movement relative to the sleeve member 44. If required, the vertical height of the cylinder 22, and of the parts carried by it, may be adjusted relative to the bracket 45 by turning the sleeve member 44 after the nuts 46 and 47 have been slackened.

At the lower end of the cylinder 22 there is an air inlet pipe 48 by means of which air under pressure may be introduced into the lower portion of the cylinder 22. The pressure of air so introduced will cause the piston 25 to rise against the pressure of the spring 27. When the air is allowed to escape from the cylinder 22 the spring 27 will force downwardly the piston 25, as well as the tubular piston rod 26 and the parts carried thereby.

Fastened to the bottom of the cylinder 22 is a smaller cylinder 49 having an air inlet 50 near its upper end and an axial opening in its lower end. There is, more over, an axial opening through the upper end of the cylinder 49 and lower end of the larger cylinder 22. An inner tubular piston rod or mandrel 51 is fastened to a piston 52 so as to be movable therewith, and said inner piston rod or mandrel 51 projects downwardly through the lower end of the cylinder 49, a gland being provided to seal the opening against excessive leakage of air. At the lower end of the inner tubular piston rod 51 is a member 53 to which is connected a pressure regulator valve 54 having an air exhaust tube 55 connected to it. A helical compression spring 56 is fitted about the tubular piston rod 51 within the cylinder 49, below the piston 52, so as to act to force the piston 52 and the inner piston rod 51 upwardly when the air pressure in the upper part of the cylinder 49 is released.

Figures 3, 4, 5:
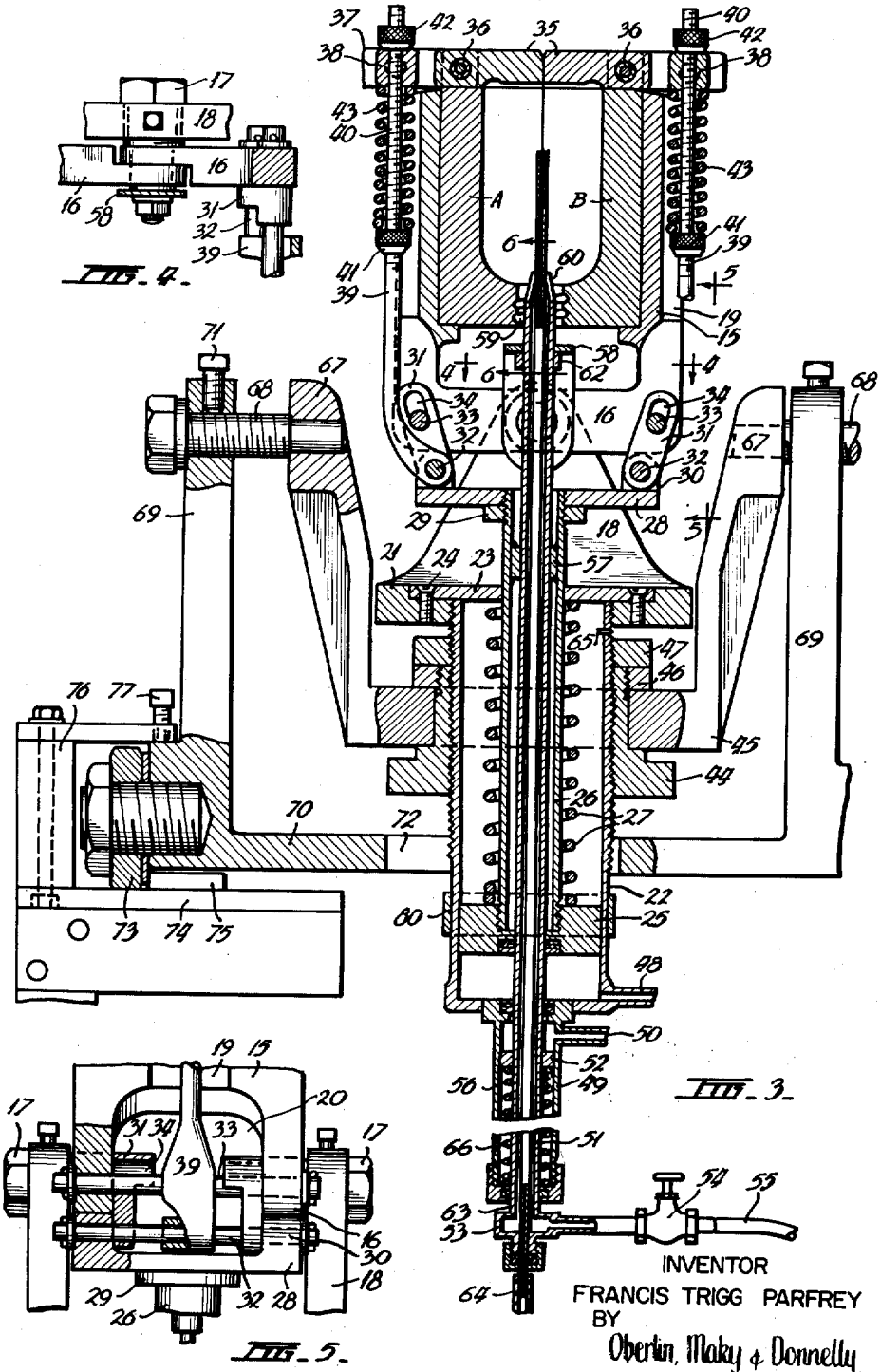
FIG. 3 shows a vertical transverse section of portion of the apparatus, the cross section being taken through the centre-line of the die and die-operation mechanism.
FIG. 4 is a horizontal cross-sectional view, of portion of the apparatus, taken on the line and in the direction indicated by the arrows 4—4 of FIG. 3.
FIG. 5 illustrates the construction of portion of the apparatus as seen in the direction of the arrows and on the line 5—5 in FIG. 3, part of the view being shown in section for clarity of illustration.
Figure 6:
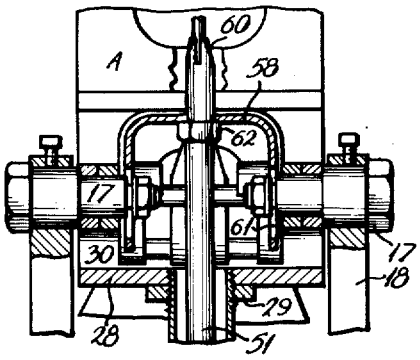
FIG. 6 is a vertical cross-section through that part of the apparatus illustrated in FIG. 5, the cross-section being taken in the same direction as FIG. 5 but on the line 6—6 of FIG. 3.

The tubular piston rod or mandrel 51 fits axially within the piston rod 26 and its upper end projects upwardly beyond the upper end of the piston rod being held in axial relationship herewith by a bush 57 provided within said piston rod 26. When the upper end of the inner piston rod or mandrel 51 is in the position as shown in FIG. 3 it projects upwardly through a stop member 58 of saddle shape—see FIG. 6—and into an opening 59 at the lower end of the composite die A, B. This opening 59 in the die A, B is provided for the purpose of forming the necks of the bottles to be mounted and as shown in the drawings the wall of the opening 59 is formed with screw threads so that the neck of the bottle formed in the die will be externally screw threaded. The upper end of the mandrel 51 is slotted radially at 60 to permit free flow of air into the mandrel from a bottle held in the die parts A, B.

The stop member 58 has slots 61 formed in its side legs and said stop member 58 is mounted on the inner ends of the bolts 17, the height of the stop member relative to the lower end of the die A, B being adjustable to suit particular requirements. A nut 62 is engaged on the mandrel 51 below the stop member 58 and said nut limits the upward movement of the mandrel 51 relative to the die A, B. The downward movement of the mandrel 51 is limited by the limitations imposed on the downward travel of the piston 52 in the cylinder 49.

Fastened within the mandrel or tubular piston rod 51 is an air inlet pipe 63 having its lower end projecting through the lower end of said inner piston rod 51 and its upper end projecting upwardly beyond the upper end of said inner piston rod or mandrel. A flexible air supply tube 64 is connected to the lower end of the air inlet pipe 63, and the air inlet pipe and the inner piston rod or mandrel 51 are adapted to move linearly as a unit when the piston 52 is caused to move by air introduced into the second or smaller air cylinder 49 or by the pressure of the spring 56 when the air is permitted to flow from the cylinder 49.

The air inlet pipe 63 is so mounted within the mandrel 51 that the air flowing through said pipe 63 may, when the mandrel 51 is supporting a hollow article such as a bottle, be exhausted through slots 60 at the upper end of the mandrel 51 and thence through the space or passageway about the external portion of the air inlet pipe 63 and through the hollow mandrel 51. The pressure regulating valve 54 is so operated that the pressure of air within the hollow article may be maintained at a desired value.

The pneumatic cylinders 22 and 49 have air flow openings 65 and 66 respectively to permit the free flow of air out of or into that portion of each cylinder to which air under pressure is not introduced, thereby enabling the pistons 25 and 52, respectively, to operate in desired fashion.

The hanger bracket 45 has a boss 67 at the upper end of each of its arms and a supporting stud 68 fits in each of said bosses. These studs 68 are screwed through the upper ends of a pair of arms 69 which extend upwardly from a base member 70, in such manner that by turning the studs 68 the lateral location of the hanger bracket 45 relative to the arms 69 may be adjusted. Set screws 71 are provided to clamp the studs 68 in adjusted position. The base member 70 is slotted longitudinally at 72 so as to provide an opening in which the cylinder 22 will be permitted to swing longitudinally when the hanger bracket 45 is moved pivotally. Said base member 70 is mounted upon runners 73 adapted to travel on the upper surface of the machine frame 74. At the opposite sides of the machine frame 74 are guide members 75 which constrain the base member 70 to travel in a straight path, and outwardly of the guide members 75 are pedestals 76 which carry clamp screws 77 by means of which the base member 70 may be tightly clamped in set positions relative to the machine frame 74.

Mounted on the machine frame 74 is a hydraulic ram 78, which is connected to the base member 70, having in it a return spring 79. The ram 78 and spring 79 are used when it is desired to move the die A, B longitudinally in a linear path in the operation of the machine—as in the formation of large size bottles—but are not used if the base member 70 is required to be held in the one position during the operation of the machine.

Secured to the lower end portion of the pneumatic cylinder 22 is a clamp member 80 to which is pivotally connected the outer end of a ram which projects outwardly from a hydraulic cylinder 81 fastened pivotally to the machine frame 74. As hydraulic fluid is introduced into the cylinder 81 the ram will move either outwardly or inwardly so as to cause the hanger bracket 45 to tilt pivotally either forwardly or backwardly. The hydraulic mechanism is so arranged and mounted that when the ram is in its innermost position in the cylinder 81 the hanger bracket 45 and the die parts A and B are in a substantially vertical position. In an alternative arrangement and construction the hydraulic ram is replaced by a pneumatic ram—to speed up the operation of the apparatus—and spring means are provided to return the hanger bracket 45 to vertical position.

In order to provide for mobility of the machine the frame 74 is mounted upon wheels 82, and there are provided rod bearing members 83 which may be screwed downwardly to take the weight of the machine and thereby hold the frame 74 and apparatus mounted on it in fixed position.

Figure 1:
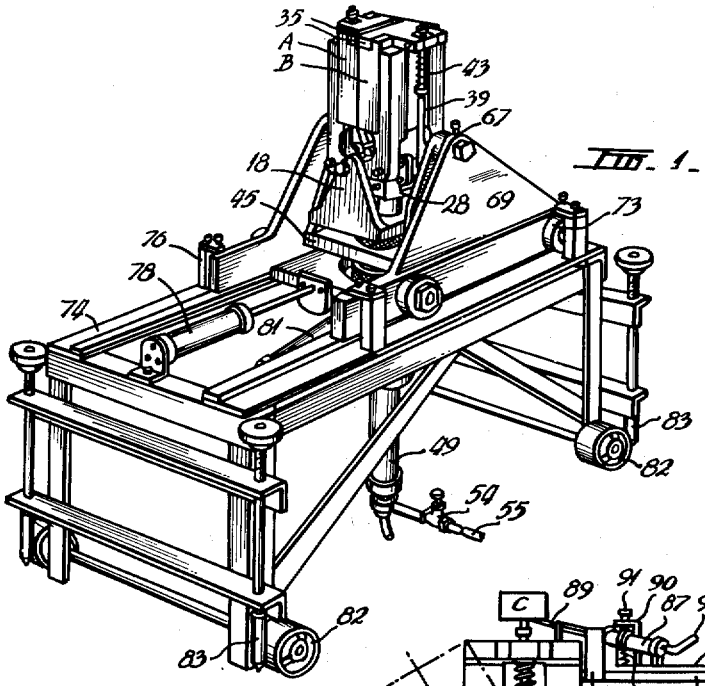
FIG. 1 is an illustrative perspective view of apparatus according to the invention constructed for use in association with a screw-type extruder.
Figure 2:
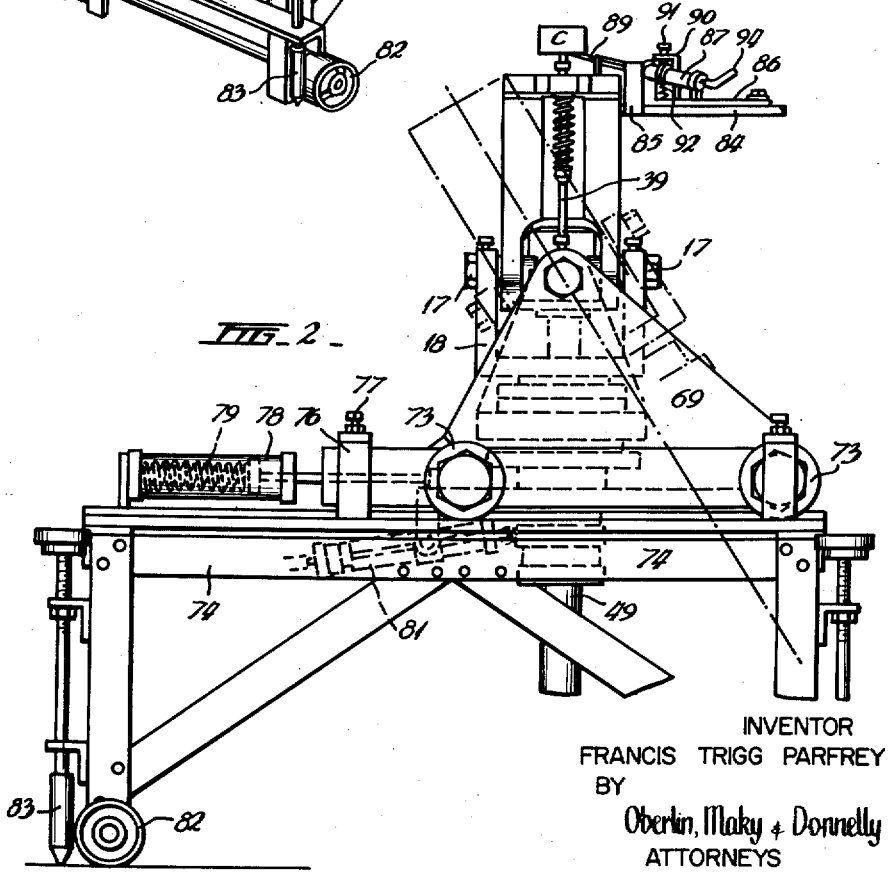
FIG. 2 is a side elevation, partly broken away, of the machine depicted in FIG. 1.
Figure 7:
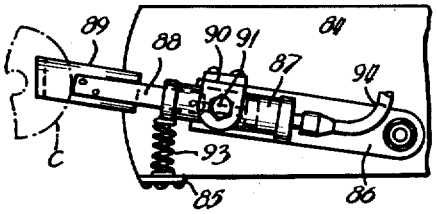
FIG. 7 shows a plan view of the cutter by means of which the extruded plastic material is cut off below the extrusion nozzle.

Associated with the apparatus for forming the hollow article is the cutter mechanism depicted in FIGS. 2 and 7. This mechanism includes a mounting platform 84 to which is fastened a side plate 85, and a base plate 86 is pivotally mounted on the platform 84. A pneumatic ram 87 is mounted on the base plate 86 and at the outer end of the piston rod 88 there is fitted a cutter blade 89. A bracket 90 is secured to the base plate 86 so as to provide a support for an adjusting screw 91 which bears downwardly upon the upper surface of the ram 87. The ram is pressed upwardly against the screw 91 by a compression spring 92, and a second spring 93 is mounted between the side plate 85 and the ram 87 so as to be adapted to press the ram and the base plate 86 away from the side plate. An air line 94 is connected to the ram 87 so as to provide for the supply of air under pressure to the ram to operate the cutter.

The cutter mechanism is adusted, by means of the screw 91, so that the cutter blade 89 will travel across, and in contact with, the lower end of the extrusion die—denoted by the reference C. The cutter blade 89 is normally held in correct position, ready to cut the plastic material extruded from the extrusion die C, by the blowing die A, B and the sequence of operations is such that the blade 89 will cut the plastic material extruded from the die C; then, as the blowing die parts A, B are moved away from beneath the die C immediately the cut is made, the spring 95 will press the ram 87 sideways and the blade 89 will be moved to one side out of the way of the material being extruded from the die C. The blade 89 is subsequently retracted, and then returned to initial position ready for the next cutting operation when the blowing die A, B is returned to initial position.

The die parts A, B are so made that the die is adapted to be cooled by any suitable means, as by the flow of cold water or cold air. To obtain the most efficient cooling of the die, it is preferred to use cold water and the die parts A and B may be connected to a cold water supply in conventional manner.

The die parts A and B may, of course, be made to any particular desired internal shape required for the formation of any particular article.

The apparatus according to this invention, is adapted to be mounted beneath the extrusion nozzle or die C of an extrusion machine, the extrusion nozzle or die being so arranged that it extrudes tubular plastic material in a downward direction. The moulding apparatus is mounted so that the tubular plastic material will be extruded directly above—but necessarily about—the hollow mandrel 51 and said mandrel is made to fit within the lower end of said hollow plastic material. That is to say, the external shape of the mandrel 51 will be made to suit the internal size and shape required for the particular hollow article to be moulded.

Figure 8:
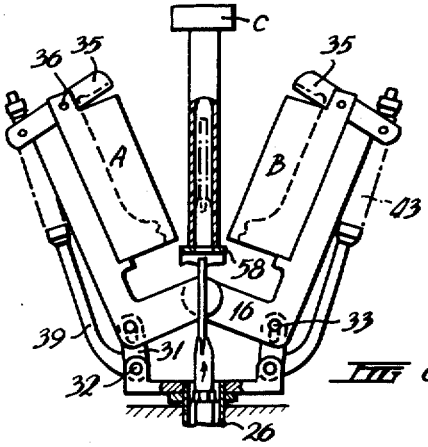
FIGS. 8, 9, 10 and 11 are diagrammatic views illustrating the sequence of operations in carrying into effect the method of this invention.

The moulding apparatus is adapted to be operated so as to perform the following operations in the sequence stated. At the commencement of operations the tubular plastic material is extruded from the extrusion die C when the parts A and B of the moulding die are in opened-apart position—see FIG. 8—and the mandrel 51 is held in a substantially vertical position. The mandrel 51 is, at that state, in its retracted position below the stop 58 so that the tubular plastic material is extruded directly above or over, but not about, the mandrel, the plastic material passing between the parts A and B of the moulding die.

Figure 9:
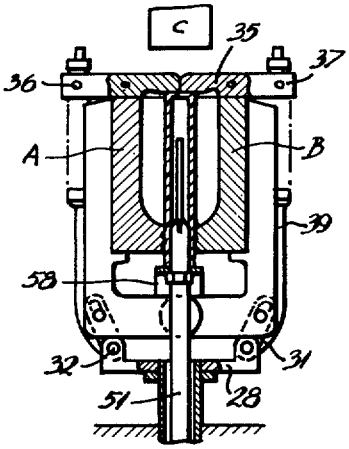

There may be provided means—such as a photoelectric cell or a micro-switch—whereby, when a desired length of tubular plastic material has been extruded, automatic mechanisms are operated so that air pressure is released from the cylinder 49 and air under pressure is supplied to the cylinder 22, the mandrel 51 and the air inlet pipe 63 are raised to operative position by the spring 56, and the parts A and B of the moulding die are closed together—see FIG. 9. When the die parts A and B are closed the tubular plastic material is severed by the cutter blade 89.

Figure 10:
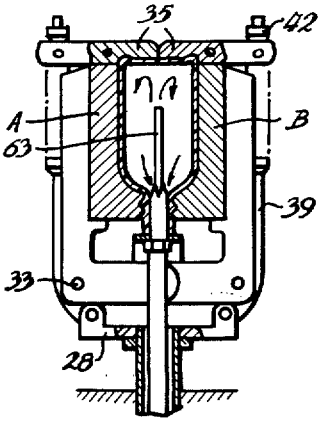

With the closing of the die parts A and B the top members 35 pinch the upper end portion of the tubular plastic material so that the upper end of the tube is closed. Immediately the blowing or moulding die is closed the hydraulic ram 81 is operated so that the hanger bracket 45 and the mounting member 18, cylinders 22 and 49 and die parts A and B carried thereby are caused to pivot forwardly so that the die parts A and B are moved away from the position under the extrusion nozzle so that the extrusion of the tubular material can continue without interruption. Simultaneously, an air inlet control valve is operated so that cold air is blown through the injection nozzle 63 within the mandrel 51 so as to cause the tubular plastic material to be blown to the shape of the die—see FIG. 10. It will be understood that the die parts A and B are so made that when the parts of the die are closed together the lower end portion of the tubular plastic material is clamped tightly about the mandrel 51 and will thus be pressed to the desired external shape of that end of the hollow article. As the tubular plastic material is in a very soft condition, having just passed from the extrusion nozzle or die C of the plastic extrusion machine, it will be readily formed to shape by the pressure of the air blown through the nozzle 63. Furthermore, it will be readily cut by the cutter blade 89.

The mandrel 51 is moved with the mounting member 18 so that after the die parts A and B are closed and the mounting member 18 swung forwardly the mandrel 51 will still project substantially axially into the die parts A and B and air under pressure may flow through the injection nozzle 63.

Figure 11:
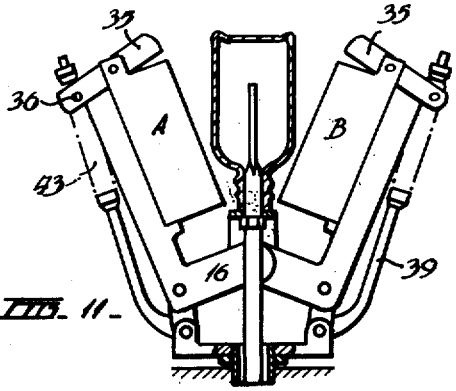

After a short interval of time, during which the formed hollow article is cooled sufficiently so that it will retain its shape after removal from the die parts A and B, the pressure of air within the cylinder 2 is released so that the spring 27 forces the piston 25 downwardly, the tubular piston rod 26 is retracted relative to the mounting member 18, and the die parts A and B are opened apart to permit the formed hollow article to be removed therefrom—see FIG. 11. Air under pressure is forced into the cylinder 49 so as to cause the piston 52 to move downwardly, thereby retracting the mandrel 51 and air pipe or nozzle 63 to a position below the stop 58. The formed hollow article is then not supported and as the apparatus is inclined from vertical the formed article will fall off the stop 58 into a suitable receptacle. Then the hydraulic pressure in the ram 81 is released so that the ram piston is retracted and the hanger bracket 45, mounting member 18 and apparatus carried thereby is returned to vertical position with the mandrel 51 directly beneath the plastic material which has been extruded from the extrusion die C during the performance of the blowing, cooling and ejection operations on the preceding length of tubular plastic material. The mandrel 51 is then raised, the die parts A and B closed, and the sequence of operations continued for the production of the next hollow article.

There are preferably provided automatic timing means for controlling the operations of the mechanism so that the several operations will be performed in a desired sequence and at a desired timing. Any suitable timer or control devices may be employed for this apparatus. Alternatively, the operations of the machine may be controlled manually.

If it be desired to form relatively long hollow articles, when the time required for extrusion of the tubular plastic material is relatively long in comparison with the time required for flowing, cooling and ejecting the formed hollow article, then instead of tilting the die-supporting apparatus so as to move the die from beneath the extrusion die C the apparatus may be moved linearly by the ram 78. When this is to be done the ram 81 is disconnected from the clamping member 80 and the ram 78 is connected to the hydraulic fluid supply instead of the ram 81. The sequence of operations will be the same save that the apparatus will be moved linearly instead of being tilted.

The operation of cutting the extruded plastic material may be performed immediately as the die parts A and B are closed, or during the tilting operation. The cycle of operations may be initiated by means such as a photoelectric cell, or a micro-switch, or by other suitable means, the photo-electric cell or other means being adapted to be operated when the lower end of the tubular plastic material reaches a predetermined position within the die parts A and B so that an exact desired length of extruded material will be cut off. The measuring devices may be mounted so that the length of material to be severed may be regulated, that is to say, if it be required to cut off five inches of tubular material, then the photo-electric cell or other devices may be adjusted relative to the extrusion die so that the measuring devices will operate to cut off five inches of tubular material.

Reference is now made to the construction of machine illustrated in FIGS. 12, 13, 14, 15, 16 and 17. This machine is a composite ram-type plastic extrusion machine of conventional design and construction and blow-moulding apparatus according to the invention. In other words, these FIGURES 12 to 17 illustrate the application of the invention to apparatus for use with a ram-type extruder.

This machine has a base 111 with two pairs of columns 112 and 113 extending upwardly therefrom in spaced parallel relationship and held in that relationship by a spider 114 of somewhat cruxiform shape. A plate 115 is mounted on the upper portions of the columns 112 and 113 and the cylinder 116 of a hydraulic ram is secured on that plate, the vertical height of the plate 115 and of the cylinder 116 being adjustable by means of nuts 117 on screwed intermediate portions of the columns 112, 113. Below the plate 115 is a second plate 118 which may be adjusted in position vertically, relative to the plate 115, by means of nuts 119 on said columns. And a third plate 120 is mounted below the plate 118, being held in position by the nuts 121 on said columns. The plates 118 and 120 support the extrusion cylinder and nozzle 122, 123 of a ram-type extrusion machine.

Mounted within the cylinder 116 is a piston—indicated by dotted lines—and to that piston is fastened the ram 124 of the extrusion machine and a piston rod 125, the latter extending upwardly through a boss 126 in the spider 114. To the rod 125 is fastened a head member 127 carrying, at its outer ends, two rods 128 and 129. These rods, 128 and 129 may be adjusted vertically in position, relative to the head member 127, by the nuts 130 and they fit slidably through bosses 131 on the upper plate 115. The rod 129 also fits slidably through a boss 132 on the second plate 118. As the piston of the ram moves vertically the rod 125 will move with it and carry the rods 128 and 129. Fitted adjustably on the rod 129 is a collar 133 which is adapted to actuate a pneumatic control valve, indicated generally at 134, which is supported by brackets 135 mounted on one of the columns 113.

Figure 13:
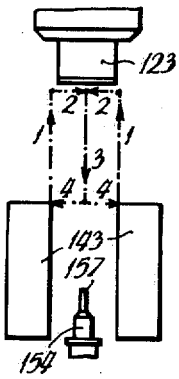
FIG. 13 is a diagrammatic illustration showing the sequence of operations of the die.
Figure 12:
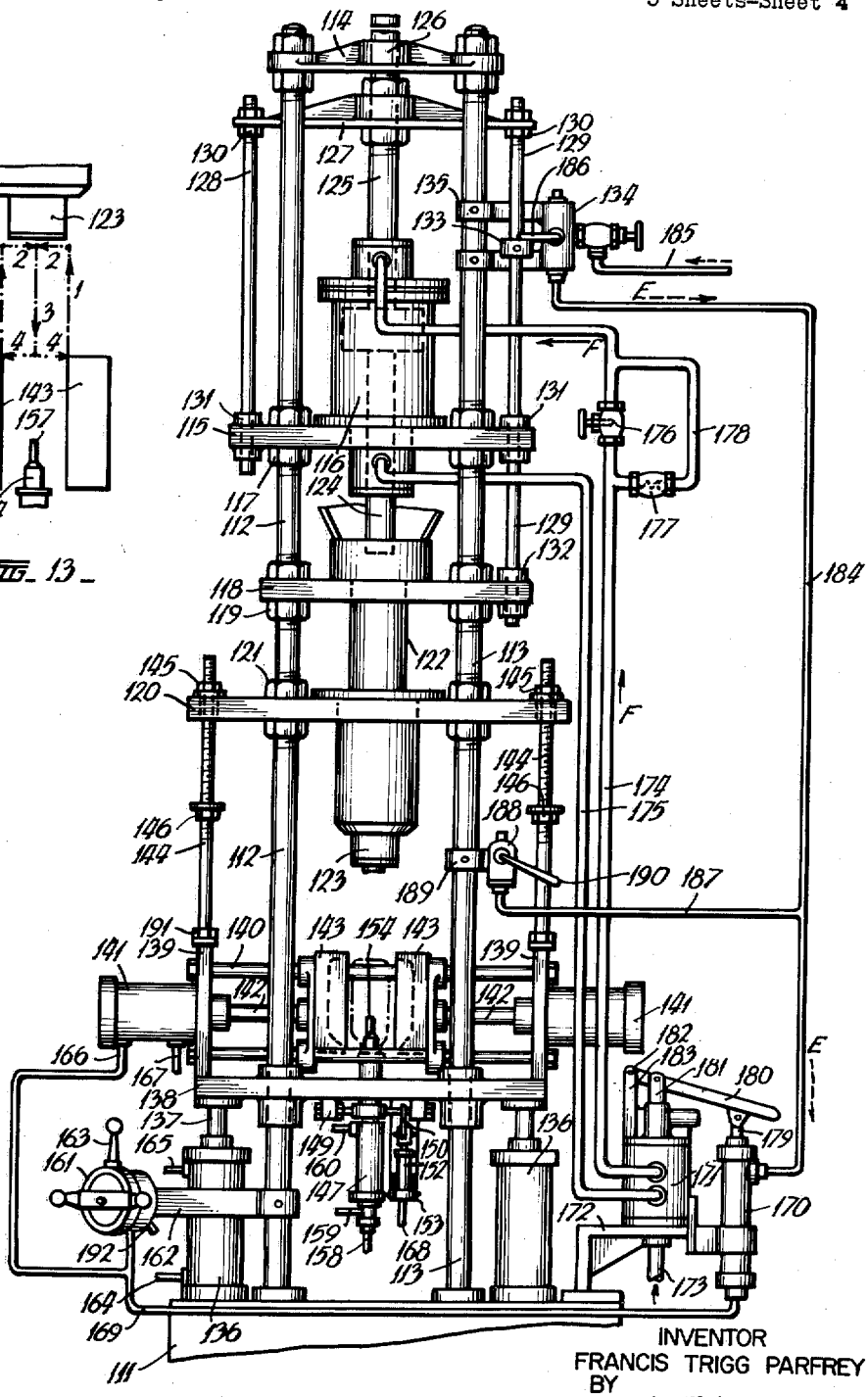
FIG. 12 is a front elevation illustrating a ram-type plastic extruded with which is incorporated plastic hollow-ware manufacturing apparatus according to the invention, the fluid pipe lines and control mechanisms being shown spread out somewhat for purposes of clarity of illustration.

Mounted on the base 111 are two pneumatic rams 136 having piston rods 137 connected to and supporting a platform 138 which is slidably mounted on the columns 112, 113. That platform 138 may be raised or lowered by the pneumatic rams 136 to bring it closer to or move it further away from the nozzle 123 of the ram extrusion machine. At opposite ends of the platform 138 are two plates 139 which are supported in spaced parallel relationship by rods 140. Two pneumatic rams 141 are mounted on the plates 139 so that their piston rods 142 are directed inwardly, and said piston rods 142 are connected at their ends to a pair of die members 143 which are mounted for horizontal sliding motion on the rods 140. When the pneumatic rams 141 are operated the die members 143 will be moved inwardly together, to closed position as shown in FIG. 15, or outwardly apart to open position as shown in FIGS. 13 and 14.

Two rods 144 are fastened to the two plates 139 so as to extend upwardly therefrom and said rods are slidable within openings provided in the plate 120 mounted on the columns 112, 113. The upper end portions of the rods 144 are screw-threaded, and mounted on said upper end portions are stop nuts 145 and 146, the upper nuts 145 being operative to limit the downward movement of the rods 144—and, therefore, of the platform 138—relative to the plate 120 and the lower nuts 146 being operative to limit the upward movement of the rods 144 and platform 138. As the nuts 145 and 146 may be adjusted in position relative to the rods 144 the upper and lower limits of travel of the platform 138 may be readily adjusted as required.

Also mounted on the platform 138 are a mandrel and mandrel operation means, the latter being shown clearly in FIGS. 16 and 17. These devices include a ram having a cylinder 147 which is supported at its upper end by a pair of pintles 148 engaged in bearings 149 extending downwardly from the underside of the platform 138. Fastened to one of said pintles 148 is a plate 150 connected to the piston rod 151 of a pneumatic ram 152 which is supported in a pivotal manner by a bracket 153 also fastened to the underside of the platform 138. The air inlet tube 154 is mounted within a mandrel 155 which is attached to a piston movable with the cylinder 147, the parts being so arranged that as the piston is moved in the cylinder the air inlet tube 154 and mandrel 155 are also moved. The upper end portions of the tube 154 and mandrel 155 extend upwardly through the platform 138, fitting through a slot 156 in said platform. The air inlet tube 154 is held in correct position at the top of the mandrel 155 by a truncated conical plate having a number of holes 157 through which air can flow into the mandrel.

The lower end of the air inlet tube 154 projects downwardly through the lower end of the mandrel 155 and to it is connected a pipeline 158, and to the lower end of the mandrel 155, where it projects downwardly through the lower end of the cylinder 147, is connected a pipeline 159. Another pipeline 160 is connected to the upper end portion of the cylinder 147. The mandrel 155 and tube 154 are normally held in their extended position (as shown in the drawings) by a spring mounted in the cylinder 147—said spring pressing upwardly on the piston to which the mandrel 155 is attached—and it may be retracted by pressure of air admitted to the upper end of the cylinder 147 through the pipeline 160.

The flow of air under pressure to the pneumatic rams 136, 141, and 152, to the top of the cylinder 147 and to the interior of the air inlet tube 154 may be controlled by a ratchet multi-port valve 161 which is conveniently mounted, as by the bracket 162, on one of the columns 112 of the machine. This valve 161 has an operating lever 163, and it is connected to the rams 136 by pipelines 164, 165, to the rams 141 by the pipelines 166, 167, to the cylinder 147 by the pipeline 160, to the tube 154 by the pipeline 158, and to the ram 152 by the pipeline 168. The tube 155 is connected by the pipeline 159 to an adjustable pressure relief valve (not shown) by means of which the exhausting of air from within a formed hollow article may be effected whilst maintaining a desired pressure of air within that formed article.

The valve 161 is also connected, by pipeline 169 to a cylinder 170 which is mounted adjacent a hydraulic control valve 171. That valve 171 is mounted on a bracket 172 fastened to the base 111 and to it are connected an inlet pipe 173 for the supply of hydraulic fluid under pressure and two pipes 174, 175 leading to the upper and lower ends, respectively, of the hydraulic cylinder 116. In the pipeline 174 there is a flow control valve 176, and a by-pass 177, 178 for said valve, said by-pass comprising the one-way valve 177 and the pipeline 178.

A piston having a piston rod 179 is mounted in the cylinder 170 and that piston rod 179 is connected by the lever 180 to the plunger 181 of the hydraulic valve 171. The lever 180 is fulcrumed at 182 on a support 193 fastened to the casing of the valve 171 and the parts are so arranged that when the piston rod 179 is forced upwardly the plunger 181 is moved linearly to operate the valve 171 and when the piston rod 179 is moved downwardly the valve 171 is reversed.

The pneumatic control valve 134, previously mentioned, is connected to the top of the cylinder 170 by the pipeline 184 and it has an air inlet pipeline 185 through which air may be delivered to the valve 134 and thence through the pipeline 184 to the top of the cylinder 170. The valve 134 has a control lever 186 which is so disposed that it is adapted to be engaged with, and operated by, the collar 133 on the rod 129 which is connected to the piston within the hydraulic ram cylinder 116. The upper end of the cylinder 170 is also connected, by the pipeline 187 to an air release valve 188 mounted by means of the bracket 189 on one of the columns 113. That valve 188 has a control lever 190 adapted to be engaged by a nut 191 on the lower end of the relative rod 144.

The operation of the pneumatic valve 134 and of the hydraulic valve 171 is as follows: As the piston of the hydraulic ram 116 nears the end of its upward travel the collar 133 on the rod 129 moves the control lever 186 upwardly to open the valve 134. Air under pressure then flows through the valve 134 and pipeline 184, as indicated by the arrows E, into the top of the cylinder 170—the valve 188 being closed—and the piston rod 179 is forced down. That downward movement of the rod 179 actuates the lever 180 and causes the plunger 181 of the hydraulic valve 171 to be forced down, and in so doing the circuit for the flow of hydraulic fluid through the valve 171 to the cylinder 116 is reversed. Hydraulic fluid is then driven under pressure to the top of the cylinder 116, see arrows F, passing through the control valve 176, and the piston ram 124 and rod 125 are forced downwardly. The control valve 176 is provided so that that speed of downward movement of the ram 124 may be regulated, and the one-way valve 177 is provided to enable hydraulic fluid to escape from the top of the cylinder 116 at a desired high rate when the ram 124 is being driven upwardly. By the provision of these flow control valves there may be obtained a relatively fast upward movement of the ram 124 and a relatively slow downward movement.

As the ram 124 moves downwardly the collar 133 will move away from the control lever 186 which then drop and cause the valve 134 to be closed.

The ratchet valve 161 has an air inlet connecting pipe 192 through which air under pressure is admitted to the valve, and said valve 161 is operated to cause a number of operations to be effected in a desired sequence.

The first of these operations may be considered as being that of moving the mandrel assembly from the tilted position shown in FIG. 17 to the upright position as shown in FIG. 16. That is done by exhausting the air from within the cylinder 152, there being provided a return spring, in the cylinder 152, operative to retract the piston rod 151 and thereby return the cylinder 147, tube 154 and mandrel 155 to upright position. At the same time the pressure of air within the cylinder 147 will force the mandrel 155 and tube 154 upwardly to their upwardly extended position.

Then, the mandrel having been returned to its operative position, the operating lever 163 of the valve 161 is again moved to turn the mechanism of the valve to the next station or position and air under pressure is forced from the air inlet pipe 192 through the pipelines 164 to the lower ends of the cylinders of the pneumatic rams 136. The piston rods 137 are then forced upwardly and the platform 138 is raised to its uppermost position, when the die members 143—in their open position—are a short distance below the extrusion nozzle 123—see FIG. 14. With that upward movement of the platform 138 the nut 191 on the rod 144 engages the control lever 190 of the valve 188 and causes said valve to open, thereby releasing air from within the top of the cylinder 170—see arrow G.

If the machine has been in operation the ram 124 of the extrusion member, at that juncture, will have nearly completed a downward stroke—and in so doing will have closed the valve 134—and there will be a length of extruded tubular material extending downwardly from the nozzle 123. When the lower end of that material reaches a predetermined position relative to the die members 143—as indicated by a collar 193 on the tube 155—the operating lever 163 of the valve 161 is again operated, and in the next position of the valve air is forced through the pipelines 166 to the pneumatic rams 141. Then, the die members 143 are moved inwardly to clamp the lower end of the extruded material about the upper end of the tube 155 and to clamp the upper portion of that material between the upper ends of the die—see FIG. 15.

As the same time as air is forced through the pipes 166 to the rams 141 air is also forced through the pipeline 169 to the lower end of the cylinder 170—see arrow H in FIG. 15. The piston in that cylinder is then raised, the lever 180 is moved upwardly, the plunger 181 of the hydraulic valve 171 is lifted, and the flow of hydraulic fluid to the cylinder 116 is reversed so that it flows in the direction of the arrow I. The piston in the cylinder 116 is then moved upwardly and the ram 124 is retracted—see arrow J.

With the next movement of the operating lever 163 of the valve 161 air is blown through the air inlet tube 154 so as to cause the extruded plastic material to be formed to the shape of the die of the die members 143—the pressure being maintained in the rams 141. Any air within the formed hollow article, in excess of a predetermined pressure, will be exhausted through the mandrel 155.

The next position of the valve 161 provides for the exhausting of air from the bottom of each ram 136 and the supply of air under pressure to the top of each said ram so as to thereby force the piston rods 137 downwardly and cause the platform 138 to be lowered—see FIG. 16. With the downward movement the control lever 190 of the valve 188 is allowed to fall so as to close the valve 188. After the valve 188 is closed the valve 134 will be opened by the upward movement of the piston in the cylinder 116, such upward movement being relatively rapid.

The blowing of air through the inlet tube 154 is continued, so as to hold the formed plastic material to shape, and to effect a relatively rapid cooling, until the die members 143 are opened.

On the next two operations of the lever 163 the die members 143 are moved apart—the operation of the rams 141 being reversed—and then air is forced into the tilting cylinder 152 so as to cause the mandrel assembly to tilt as shown in FIG. 17. The formed hollow article is still in position on the end of the mandrel 155 but on the next operation of the lever 163 air is forced into the cylinder 147 so as to cause the mandrel 155 and tube 154 to be retracted, and in that retraction of the mandrel 155 the formed hollow article is forced off the end of the mandrel. That completes the sequence of operations.

It may be found possible to reduce the time taken for the complete cycle of operations if the fourth and fifth operations, for the fourth and fifth positions of the valve 161, be effected simultaneously. That is to say, the air may be forced through the tube 154 to blow the plastic material to the shape of the die at the same time as air is forced into the upper ends of the cylinders of the rams 136 to cause the platform 138 and closed die to be lowered away from the extrusion nozzle 123.

In an alternative sequence, air pressure may be injected into the formed and cooled hollow article after the die members 143 are opened so as to force the formed hollow article from the end of the mandrel 155.

In a further alternative sequence—also applicable to the form of the invention illustrated in FIGS. 1–11—the mandrel may be held in the retracted position until the die members have been closed about the extruded tubular material and then allowed to rise so as to press against the lower end of the plastic material. Such alteration of the sequence may be readily effected—in the form of the invention depicted in FIGS. 12 to 17—by altering the connections of the air lines.

For convenience, the arrows of FIG. 13—which indicate the manner in which the die members 143 are moved—are numbered according to the sequence of the operations. Thus it can be seen from this figure of the drawings that the die members are moved upwardly, inwardly to closed position, downwardly, and then outwardly.

By providing for a relatively fast return of the ram 124 from its lowermost position to its uppermost position the waiting time in the performance of the several operations may be materially reduced. Also the stroke of the ram 124 may be readily adjusted by altering the position of the collar 133 on the rod 129. By raising the collar 133 the stroke will be reduced in length and by lowering the collar the length of the stroke may be increased.

It will be noted that the operations by closing the die members 143 (and that of inserting the mandrel, if the mandrel 154 be inserted after the die is closed), of removing the closed die from the position immediately below the nozzle 123, and of cutting the extruded material are all performed while the ram 124 is moving upwardly and the rate of extrusion is relatively slow; and the main extrusion of the plastic material is effected during the operations of cooling the formed material after it has been blown to shape—which takes the longest time of all the operations—of opening the die, of ejecting or removing the formed and cooled hollow article, and of returning the die members 143 to raised position are being performed. By suitable adjustment of the rate of extrusion the operations can be readily synchronized so waiting time is reduced to a minimum.

If desired, the operations may be made automatic, and there may be provided a master switch so that an operator can switch the apparatus to automatic operation when the machine is running properly and the extrusion of tubular material is being properly effected. Such automatic operation may be effected electrically, or by pneumatic controls, or by any other suitable known means.

It will also be appreciated that in both forms of the invention the die members may be moved horizontally from the position immediately below the extrusion nozzle—if two sets of die members be provided—they may be moved angularly so that first one die is used and then the other. This latter arrangement would be useful if the cooling time required were relatively long.

The cutting of the extruded material at the top of the die or bottom of the nozzle 123 may be effected by hand. However, if desired there may be provided an automatic cutter arranged to operate with the closing of the die member 143 as illustrated in FIGS. 2 and 7.

If the machine is to be operated manually, as described with reference to the drawings, it may be found desirable to provide blank spaces in the ratchet valve 161 wherever it is desired to provide additional time for any particular operation to take place, as in the cooling operation. For example, if it be desired to provide for the cooling operation double the time that is required for the die opening and mandrel tilting operations then the valve mechanism will be so arranged that the operator will be required to operate the ratchet mechanism twice to change the valve ports from the position at which air is supplied to the mandrel to the position at which air is supplied to the rams 141 to open the die.

There may be provided valve means—as a reversing or change over valve—to effect an alteration in the sequence of operations instead of altering the connections of the several pipelines to the ratchet valve 161.

If the hollow article to be formed has a neck requiring an internal reinforcing member such member may be fitted to the mandrel in the form of a collar before each operation. Such collars may also be fitted to the mandrel to adjust the effective external diameter of the mandrel to suit different neck diameters. And if it be desired to blow the neck of a bottle, for example, to the shape of the neck portion of the die (instead of having the internal surface of the neck the same shape and size as the mandrel) then the mandrel will not require to be inserted into the tubular material, but merely held against the end of the tubular material. In this case the mandrel may be spring loaded or held resiliently in contact with the end of the extruded plastic material with a desired pressure.

In order to provide for a side opening in a hollow article in air inlet nozzle or mandrel may be mounted at one side at the appropriate location and air forced through that nozzle in such manner as to provide for the side opening.

If desired, there may be provided means for applying cool air over the outer surface of the formed hollow article after the parts of the moulding die have been opened apart so as to ensure a relatively thorough and rapid cooling of the article. There may also be provided means for trimming and finishing the formed article. Such means may include a cutter or pincer members adapted to register with or grip the upper end of the formed hollow article and cut off the part formed by closing together the end of the tubular material, and there may also be provided a second cutter to trim the lower end of the formed article. The lower cutter may be adapted to rotate about the mandrel.

If the extrusion die or nozzle of the extrusion machine—either the screw-type extruder or the ram-type extruder—has several extrusion orifices, which may be of different shapes and sizes, there may be provided a number of separate machines for moulding hollow articles, one for use with each extrusion orifice. For example, if the extrusion die has four orifices then there will be provided four machines and each machine may be adapted to produce a different article. Consequently, the one extrusion machine may be used for the production of a quantity of different articles simultaneously, or there may be obtained a four-fold production of the one article, if so desired. This flexibility in the use of the apparatus according to the invention is very important when production is required in relatively small runs. Also, if there be required a continuous output, but in relatively small quantities such as could be effected by the use of a single machine, then there may be used an extrusion machine having a small capacity and having but a single extrusion die so that there is a continuous output from the machine to comply with the demand for the formed articles. And then, if there be a sudden increase in the demand, an additional machine or machines may be used in conjunction with an extrusion machine having a larger capacity so as to fulfill the supply requirements. This mode of operation has definite advantages when compared with the continuous use of a machine having a large capacity but operating to provide a relatively small output, as the cost of operating such a large machine, even when its output is reduced, is still relatively large. In short, as the production requirements alter so may the apparatus be altered to suit these requirements. However, it will be understood that each moulding machine may be associated with its own particular extrusion machine instead of several moulding machines for each extrusion machine.

It will be found in use that a machine constructed according to my invention—whether for use with a screw-type or a ram-type extruder—will be very efficient in operation whilst being conducive to economy of production and to a high rate of continuous output of formed hollow articles. It will be appreciated that apparatus according to the invention may be modified to suit particular requirements and to incorporate additional devices necessitated in the development of the machine but all such modifications in the design and construction of the apparatus or in the sequence of operations as come within the scope of the appended claims are to be deemed as being included within the ambit of the invention.

What I claim is:

1. In apparatus for blow-molding closed-end plastic hollow-ware with a single die, extrusion means to discharge tubular plastic material, a support frame adjacent the extrusion means, a molding die carried by the frame at a plastic material receiving station adjacent the extrusion nozzle, means to open and close the die, a fluid injection mandrel comprising concentric tubes carried by the frame, means to inject the mandrel into the die and engage plastic material to effect a blowing operation thereof and to withdraw the mandrel from the die, means to move bodily the die and mandrel when so injected from said plastic material-receiving station to a second station displaced therefrom, means to pass fluid under pressure through one of the tubes of the mandrel and into the die simultaneously with such withdrawal and to exhaust the fluid through the other of said tubes to blow the plastic material to the shape of the die and concurrently to cool said material, and further means to extrude plastic material from said extrusion means into said receiving station when the die and mandrel are so displaced therefrom so that at least said cooling and extruding operations partially overlap with respect to a time sequence to provide an increased rate of production with said single die, said die being pivotally mounted on said frame, and said means to move bodily the die and mandrel turning said die and mandrel about the pivotal mounting.

2. In apparatus for blow-molding closed-end plastic hollow-ware with a single die, extrusion means to discharge plastic material, a molding die normally supported adjacent the extrusion means there to define a plastic material-receiving station, means to open and close the die, a fluid injection mandrel adapted to have an end positioned within the die to engage plastic material therein and effect a blowing operation, means to reciprocate bodily the die and mandrel between only said plastic material-receiving station and an ejecting station, means to pass fluid under pressure through the mandrel when reciprocating said die and mandrel toward said ejecting station to blow the plastic material to the shape of the die, *means for* ejecting the blown material from the die and mandrel at said ejecting station, and means effective to extrude plastic material from the extrusion means to said receiving station during the time the die and mandrel are reciprocated therefrom, whereby the time required for such extrusion of the plastic material and for the reciprocation of the die and mandrel from the receiving station to the ejecting station and back again *plus the time of blowing and ejecting the material* is substantially the same.

3. Apparatus as claimed in claim 2 wherein said fluid injection mandrel comprises dual tubes and wherein said means to pass fluid under pressure through the mandrel passes such fluid through one of the tubes of the mandrel when within the die while extracting fluid through the other tube simultaneously to blow the plastic material to the shape of the die and to cool such material.

4. Apparatus as claimed in claim 2 wherein said fluid injection mandrel comprises two concentric tubes having adjacent open ends to communicate with each other within the die, and wherein said means to pass fluid under pressure through the mandrel passes such fluid continuously through one of said concentric tubes and exhausts such fluid through the other of said tubes at a rate differential simultaneously to blow the material to the shape of the die and to cool it by said continuous flow.

5. Apparatus as claimed in claim 2 wherein the mandrel is pivotally mounted adjacent said die, and further including pivoting means to turn the mandrel about said pivotal mounting and release a molded ware.

6. A method of rapidly producing blow-molded closed-end plastic hollow-ware with a single die including the steps of extruding a first length of tubular plastic material at a receiving station adjacent a die, inserting an end of a mandrel into the lower end of said first length, closing the die about said length [to clamp the lower end of the tubular plastic material about the mandrel and] *to position said first length in the die and to* close [about the upper] *one* end of said *first length of* material, pivotally moving the closed die [and mandrel] away from the receiving station to render such station available for further extrusion of plastic material, passing fluid [through the mandrel] into the *die-enclosed* tubular plastic material *through the other end thereof* while said die is away from the receiving station to blow such material to the internal shape of the die, simutlaneously extruding a second length of tubular plastic material at said receiving station, removing the blown ware from the die, and then returning the same die to such receiving station to enclose such second extruded length, the time required for such second extrusion and for such movement and return of the die *plus the time of blowing and removing* being substantially the same.

7. A method of rapidly producing blow-molded closed-end plastic hollow-ware with a single die including the steps of continuously reciprocating a die and mandrel between only a receiving station and an ejecting station, extruding a first length of tubular plastic material at such receiving station during the absence of such die and mandrel therefrom, subsequently inserting a mandrel into the lower end of such first length and closing the die about such length to clamp the lower end of the tubular plastic material about the mandrel and to close about the upper end of said material at such receiving station, passing fluid through the mandrel into the tubular plastic material while so reciprocating the mandrel and die toward the ejecting station to blow such material to the internal shape of the die, simultaneously extruding a second length of tubular plastic material at such receiving position, and ejecting the blown ware from the die at such ejecting station, the time required for such second extrusion and for such reciprocation of the die and mandrel from the receiving station to the ejecting station and back again *plus the time of blowing and removing* being substantially the same.

8. A method as claimed in claim 7 wherein such step of passing fluid through the mandrel into the tubular plastic material includes continuously passing fluid in opposite directions longitudinally of such mandrel and at a rate differential simultaneously to blow the plastic material to the shape of the die and to cool the material by such continuous flow.

*9. A method of rapidly producing hollow blow-molded plastic articles with a single partible mold, including the steps of issuing a first heated tubular formation of thermoplastic material from an extrusion orifice, closing the particle mold on said tubular formation to position same within the partible mold, severing the mold-enclosed tubular formation from the thermoplastic material in the extrusion orifice, moving the closed particle mold along a fixed path and in a first direction to a remote position relative to the extrusion orifice, applying fluid pressure to the interior of the mold-enclosed portion of the tubular formation to expand such portion to conform to the cavity of the partible mold, opening said partible mold and removing the expanded thermoplastic formation, returning the open partible mold along a path parallel to said fixed path and in a direction reverse to said first direction to a position adjacent the extrusion orifice, and, prior to the return of said partible mold, issuing another heated tubular formation of thermoplastic material from said extrusion orifice so that the above-described steps may be immediately repeated.*

*10. A method as defined in claim 9, wherein the fixed path along which the partible mold is moved is arcuate.*

*11. A method as defined in claim 9, wherein the fixed path along which the partible mold is moved is linear.*

*12. In a blow molding apparatus having an extruder for issuing a pendant tube of plasticized material from an orifice, a blow-mold engageable with the pendant tube to enclose the tube and means for blowing the tube to the internal configuration of the blow-mold, the improvements of means supporting the blow-mold adjacent the extruder for pivotal movement from alignment with the extruder orifice to provide clearance for a subsequently extruded pendant tube and to pivotally return the blow-*

*mold in substantially the same path of movement for enclosing the subsequently extruded tube, and power means for moving and returning the mold.*

*13. A method of rapidly producing blow-molded closed-end plastic hollow-ware with a single die including the steps of (1) extruding a first length of tubular plastic material at a receiving station, (2) positioning at said receiving station a die having closable die sections straddling the previously extruded first length, said sections when closed cooperably defining an interior mold recess, (3) closing the die sections about said first length to dispose the first length in the mold recess and to form said first length into a blowable blank, (4) moving the closed die sections and said first length away from the receiving station to render such station available for the subsequent extrusion of a second length of plastic material, (5) passing fluid into said blank to blow the same to the internal shape of the die, (6) cooling the blown blank to a self-sustaining shape internally of the die, (7) extruding a second length of tubular plastic material at said receiving station, (8) removing the blown blank from the die, and then (9) returning the same die to such receiving station to enclose said previously extruded second length, the time required for extrusion of said second length being substantially the same as the time required for steps 3 through 6, 8 and 9 hereinbefore recited.*

*14. In a method of rapidly producing blow-molded closed-end plastic hollow-ware with a single closable die linearly movable between first and second stations, including the steps of extruding through an orifice a first length of tubular plastic material at the first station adjacent the die, positioning the open die at said first station in proximity to the already extruded first length, closing the die about said first length to pinch shut one end of the first length, severing the die-enclosed first length from the orifice, moving the closed die away from the first station to said second station to accommodate the further extrusion of a second length of plastic material from said orifice, blowing air into the tubular first length enclosed in the die while said die is away from the first station to blow such material to the internal shape of the die, cooling the blown material internally of the die and while the die is at said second station, extruding a second length of tubular plastic material at said first station, removing the blown and cooled ware from the die at said second station and then returning the same die to said first station to enclose such second extruded length, the time required for the extrusion of said second length and for such movement and return of the die and blowing, cooling and ejecting of the first length being substantially the same.*

*15. A method of rapidly producing hollow blow-molded plastic articles with a single partible mold having mold sections, including the steps of issuing a first heated tubular formation of thermoplastic material from an extrusion orifice, closing the partible mold sections on said tubular formation to position it within the partible mold, severing the mold-enclosed tubular formation from the thermoplastic material in the extrusion orifice in such an manner as to leave at least one end thereof open, moving the closed partible mold along a fixed path and in a first direction to a remote position relative to the extrusion orifice, applying fluid pressure to the interior of the mold-enclosed portion of the tubular formation subsequent to the closing of said mold sections to expand such portion to conform to the cavity of the partible mold, opening said partible mold and removing the expanded thermoplastic formation, returning the open partible mold sections along paths parallel to said fixed path and in a direction reverse to said first direction to a position adjacent the extrusion orifice, and issuing a second heated tubular formation of thermoplastic material from said extrusion orifice prior to the return of said partible mold thereto, so that the above described step may be immediately repeated.*

*16. The method of forming hollow plastic articles comprising issuing a hollow open-ended substantially tubular formation of the thermoplastic material from an orifice, said material of the issued formation being in a condition of plasticity to permit expansion and setting in predetermined form, engaging said issued formation at at least one point, quickly severing a length of the formation intermediate said engagement and the orifice and in such a manner as to leave the severed ends of said formation open, substantially coincident with said severing moving the engaged and severed length of the formation away from the orifice to space apart said severed ends of said formation, pinching and sealing said severed length at a point thereon within molding apparatus, and expanding at least a portion of the severed length to the walls of the molding apparatus by applying fluid under pressure through the open end of said severed length.*

*17. The method as defined in claim 16 wherein the engaged and severed length of the formation is moved away from the orifice linearly.*

*18. The method as defined in claim 16 wherein the engaged and severed length of the formation is moved away from the orifice in a parth of movement having both horizontal and vertical components of motion.*

*19. The method of forming hollow plastic articles having an opening, which method comprises continuously extruding a tubing of plastic material outwardly from an orifice, introducing the substantially continuous tubing of plastic material to the open sections of a partible mold, said tubing being in a condition of plasticity to permit expansion and setting in predetermined form, the leading end of said tubing being open, sealing said tubing at a point along the length thereof by closing the sections of the mold, moving said mold away from the orifice in a direction having both a horizontal and vertical component of motor while severing the tubing in the mold from the remaining tubing in such a manner as to leave the severed ends of said remaining tubing open, and expanding the tubing in the mold to the walls thereof by applying fluid under pressure through its open end portion.*

*20. The method of claim 16 wherein the engaging of said issued formation is by molding apparatus.*

References Cited in the file of this patent or the original patent

UNITED STATES PATENTS

| | | |
|---|---|---|
| 2,298,716 | Moreland | Oct. 13, 1942 |
| 2,597,558 | Bailey | May 20, 1952 |
| 2,787,023 | Hagen et al. | Apr. 2, 1957 |
| 2,810,934 | Bailey | Oct. 29, 1957 |
| 2,903,740 | Parfrey | Sept. 15, 1959 |
| 2,928,120 | Leghorn et al. | Mar. 15, 1960 |
| 2,975,473 | Hagen et al. | Mar. 21, 1961 |

FOREIGN PATENTS

| | | |
|---|---|---|
| 495,105 | Belgium | Apr. 29, 1950 |
| 1,109,688 | France | Sept. 28, 1955 |
| 697,326 | Great Britain | Sept. 23, 1953 |
| 744,927 | Great Britain | Feb. 15, 1956 |